INVENTORS
WILLIAM A. HEATLEY, Jr.
EMERY R. SCHAFFER
BY
James and Franklin
ATTORNEYS INVENTORS
WILLIAM A. HEATLEY, Jr.
EMERY R. SCHAFFER
BY James and Franklin
ATTORNEYS Jan. 12, 1965 W. A. HEATLEY, JR., ETAL 3,165,056

REGISTRATION CORRECTION USING A SINGLE COMPUTER TO PROVIDE PLURAL UNEQUAL CORRECTIONS

Filed April 1, 1963 5 Sheets-Sheet 3

INVENTORS.
WILLIAM A. HEATLEY, Jr.
EMERY R. SCHAFFER
BY James and Franklin
ATTORNEYS Jan. 12, 1965 W. A. HEATLEY, JR., ETAL 3,165,056

REGISTRATION CORRECTION USING A SINGLE COMPUTER TO PROVIDE PLURAL UNEQUAL CORRECTIONS

Filed April 1, 1963 5 Sheets-Sheet 4

INVENTORS.
WILLIAM A. HEATLEY, Jr.
EMERY R. SCHAFFER

BY James and Franklin

ATTORNEYS

INVENTORS
WILLIAM A. HEATLEY Jr.
EMERY R. SCHAFFER
BY
James and Franklin
ATTORNEYS

3,165,056
REGISTRATION CORRECTION USING A SINGLE COMPUTER TO PROVIDE PLURAL UNEQUAL CORRECTIONS

William A. Heatley, Jr., Wayne, and Emery R. Schaffer, West Orange, N.J., assignors to Champlain Company, Inc., Roseland, N.J., a corporation of New York Filed Apr. 1, 1963, Ser. No. 269,418
24 Claims. (Cl. 101—181)

This invention relates to registration control apparatus, and more particularly to such apparatus for a web line having three or more stations.

There are many instances in which three or more units operating on a continuously moving web must be kept in proper registration. A common example is multi-color printing press in which each printing unit applies a different color on a traveling web. While this invention refers to and discusses such a printing operation, it is equally applicable to spot coating, embossing, scoring, cutting, perforating, punching and other such operations on a traveling web.

Registration must be continuously maintained when dealing with fast moving webs, because the web may shrink slightly or stretch slightly. Changes in humidity, temperature, tension, web speed, web thickness or stopping of the web, all may introduce changes in registration which must be corrected or compensated.

It is common in the art today to correct for such changes by an automatic control means such as that disclosed in U.S. Patent 2,888,260 granted May 26, 1959 to G. J. Schowerer et al., but such devices correct only one color station at a time. Thus, in a six color printing press it is common practice to use five such automatic devices to maintain color register to a common color.

Introduction of a correction at one station or color unit affects the registration of adjacent and succeeding stations or color units. The stations are interconnected by the taut web, with resulting instability because a correction at one color unit may set off a chain of corrections at succeeding color units.

It has already been proposed to minimize the interaction of the color units by ganging the correction devices together so as to make a correction not only at the unit in which an out of register condition has been sensed, but also simultaneously in all of the following color stations. This is disclosed in U.S. patent application Serial No. 111,120, filed on April 3, 1961, by F. G. Auer et al., now Patent No. 3,102,471 wherein they minimize interaction by making instantaneous and equal corrections in succeeding but not preceding color stations.

The primary object of the present invention is to generally improve registration control apparatus. A more particular object is to improve the apparatus disclosed in said pending application Serial No. 111,120. This is done by providing progressively proportional corrections to adjacent or succeeding stations or color units, with or without the additional provision of an adjustable time delay control.

Ganged corrections that are equal in all succeeding stations result in improved stability and less interaction. However, for purposes of economy and simplicity it would be desirable to have only one register device control an entire press or series of stations. The aforesaid application Serial No. 111,120 requires a separate register control device at every station. It reduces the amount of correction needed in later stations but does not eliminate the need for further correction at the later stations.

We have found that when changes of web characteristics cause an error in color registration, the error increases at each succeeding color station, and is almost directly proportional to the web length from the key or first color. For instance, if the web length from color #1 to color #6 is twice as long as from color #1 to color #3, then the error in #6 color station will be twice as large as the error in #3 color station. We have discovered that a single register control may be used, and proper corrections may be fed from such single control unit to a plurality of succeeding units, provided that the amount of correction is increased in proportion to the web distance from the key color. This produces a nearly exact correction and reestablishes or maintains color register.

The instantaneous feeding of progressively proportional corrections to succeeding color units reaches a limit of practicability in multi-color presses having say five or six colors. This is so because the corrections, if made at the same instant on color stations exceeding five or six, are made before the error shows up on the web at these later stations. A further object of the invention is to overcome this difficulty, and to prevent the correction from being too anticipatory at such late stations. For this purpose we provide for an adjustable time delay, although the corrections still originate from a single common register control unit.

To accomplish the foregoing general objects, and other more specific objects which will hereinafter appear, our invention resides in the apparatus elements and their relation one to another, as are hereinafter described in greater detail in the following specification. The specification is accompanied by drawings in which.

Figure 3:
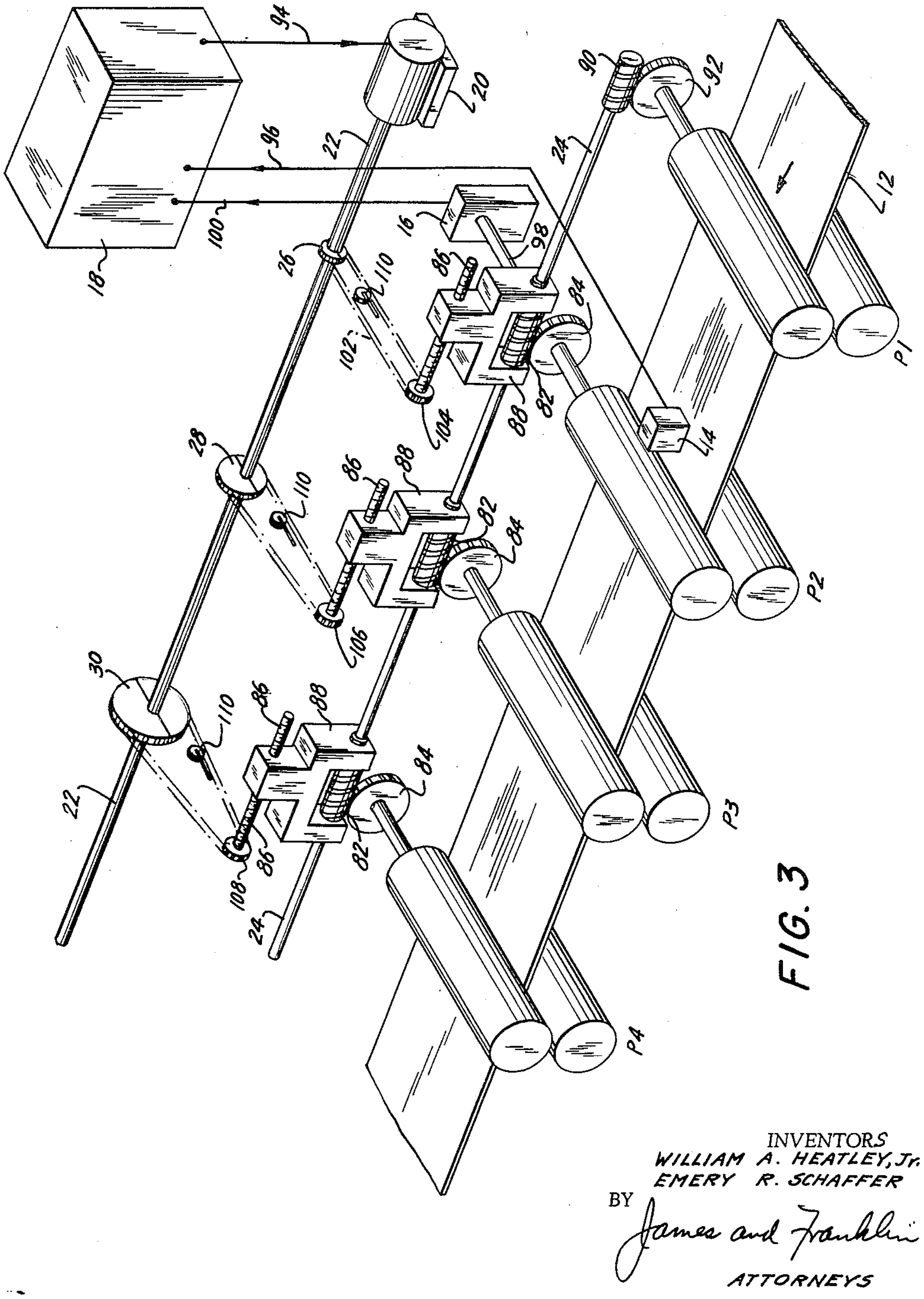
FIG. 3 is a schematic perspective view explanatory of a multicolor press line having four or more stations.

Referring to the drawings, and more particularly to FIG. 3, the apparatus comprises three or more stations, in this case color printing couples P1, P2, P3 and P4, which operate on a moving web 12. The first station includes means to apply a reference marker on the web, and that is done inherently when the station is a printing couple, as here shown. There are scanning means 14, 16 at any later control station, in this case the station P2, and computer means 18 to detect and measure a departure from registration at the control station P2. There is also a means, in this case a reversible motor 20, which is responsive to the computer means 18 for making a control correction at the control station P2, and for making related corrections at all other stations except the first, that is at stations P3 and P4, in addition to station P2. In accordance with the present invention the corrections are progressively increasing in magnitude in the direction of movement of the web, that is, the correction at station P3 is greater than that at station P2, and the correction at station P4 is still greater.

In preferred form the corrections are approximately proportional to the length of web between the first station and the subsequent stations. In the present case it may be assumed first that the web length between stations is equal, and in such case the correction at station P3 would be double that at station P2, and the correction at station P4 would be triple that at station P2, this being proportional to the web length undergoing either shrinkage or stretch. In FIG. 3 this increase in correction is obtained by simple direct mechanical means, the reversible correction motor 20 driving a correction shaft 22 which extends collaterally of the main drive shaft 24, but the sprocket wheels 26, 28 and 30 on shaft 22 increase diameter.

It will be understood that in practice the actual web length between stations may be very much greater than is suggested in FIG. 3. When the stations are printing couples, the web may be run transversely through a number of long convolutions in a suitable drier, in order to thoroughly dry a first color before reaching the next printing couple to apply a second color, and so on.

Figure 1:
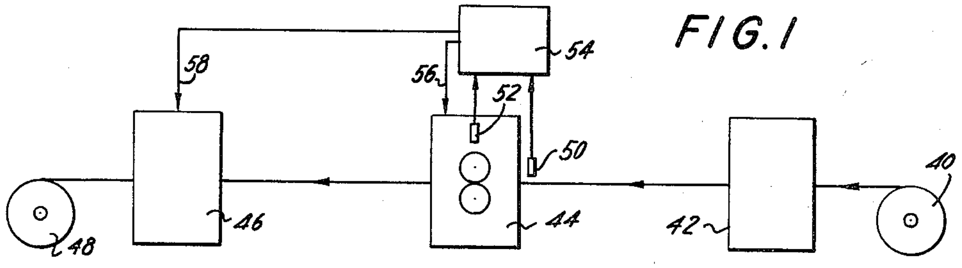
FIG. 1 is a schematic representation of apparatus comprising three stations with equal web length between stations.

Referring now to FIG. 1 of the drawing, a web supplied at roll 40 passes through stations 42, 44 and 46, and is wound up at roll 48. Web pull units and driers may be employed, but these have been omitted to simplify the drawing. A reference marker is applied at station 42. Scanning means 50, 52 are located at station 44, and together with computer means 54 detect and measure a departure from registration. The computer means supplies a correction through line 56 leading to suitable register-correcting means at station 44, and supplies an increased correction through line 58 leading to station 46. As is well known in this art, the correction means may include differential gearing to provide a running register, or it may shift the worm of a worm drive axially, or it may move the position of a compensating roller. When, as shown in FIG. 1, the web length from station 42 to station 44 is the same as from station 44 to station 46, the correction at station 46 is preferably made double that at station 44.

The scanning and computer circuitry may be of any conventional type. In one known form the scanner 50 observes the marker put down in print unit 42, and the scanner 52 observes a marker which rotates with the print cylinder of print unit 44. In the aforesaid Patent 2,888,260 the scanner 52 is called a "phase micrometer." The model C–300 or C–300–1 "Registon" manufactured by Champlain Company, Inc. of Roseland, New Jersey may be used.

Figure 2:
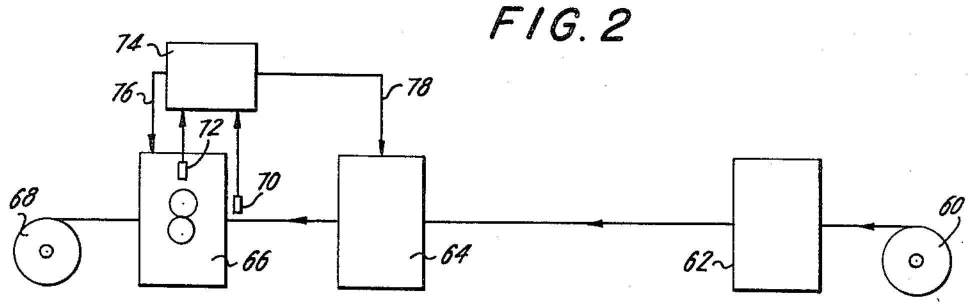
FIG. 2 is a similar schematic representation of apparatus comprising three stations with unequal web length between stations, and with scanning means at the third instead of the second station.

Referring now to FIG. 2 of the drawing, the web is supplied from a roll 60, and runs through stations 62, 64 and 66 to a roll 68. FIG. 2 embodies two changes, compared to FIG. 1. One difference is that the web length between station 62 and station 64 is assumed to be double the web length between station 64 and station 66. Another difference is that the scanning means 70, 72 are located at the third station 66, instead of the second station 64. As before, the computer 74 measures the error in registration, and supplies a correction call to a suitable correction motor through a line 76 to station 66, and it also supplies a correction call through line 78 to station 64. In this case the correction called for at station 64 is preferably two-thirds that at station 66, this being in proportion to the length of web between station 62 and the subsequent station 64 and 66. If the scanners and computer were at station 64, the correction ordered at station 66 would be one and one half times that ordered at station 64.

Reverting now to FIG. 3, the printing rolls or couples P1, P2, P3 and P4 etc. are driven through suitable worm and worm gears 82 and 84 by the main drive shaft 24. The drive shaft 24 is driven by an electric motor or other suitable main drive means, not shown. In rotogravure it is the lower cylinder that would be used as a print cylinder and that would be driven by the main drive shaft. The worms 82 are splined and adjustable axially on the shaft 24 to vary the relationship between the print cylinder and the common drive shaft. This is accomplished by turning the threaded control screw 86 which in turn moves the yoke 88 and worm 82. The first printing rolls P1 for purposes of this example do not require this adjustment, and are simply driven by worm 90 and worm gear 92 from shaft 24.

A conventional computer control panel box 18 is provided for actuating the correcting shaft 22 through a control line 94 and a reversible correction motor 20. The motor may be of the electric, hydraulic or other similar type. The web scanner 14 is illustrated as being of the photoelectric type, although it may be of other conventional types. It is located adjacent to the second printing rolls P2, where it scans a printed mark laid down by the first printing rolls P1. The color printed by the first printing rolls is considered the reference or key color in this illustration. (However, the device is not limited by this and the second or third color may be used as the key.)

The scanner 14 receives an impulse from the mark and relays it to the computer control 18 through line 96 whenever the selected or "gated" mark of the printing on the web passes by. A conventional phase detector or "phase micrometer" 16 is located on the connection shaft 98 and is connected to printing rolls P2. This is of known design, and it relays a position reference signal of cylinder P2 through line 100 to the computer control 18. Comparison of signals takes place in computer 18, and if a correction is warranted it is applied through line 94 to turn the reversible correction motor 20 and shaft 22 in the proper direction.

The scanner 14, phase detector 16 and computer control 18 may be of known design, and as they form no novel part of the present invention, a detailed description is deemed unnecessary. They may be of the type shown in the Patent 2,888,260, or manufactured by Champlain Company, Inc. as mentioned above.

The correction shaft 22 is a common shaft to all units, and through sprocket and chain drive 26, 102 and 104 it actuates the threaded control screw 86 and applies a correction to couple P2.

Succeeding color units are actuated in the same manner, but the driving sprockets 26, 28 and 30 become increasingly larger in size, while the driven sprockets 104, 106 and 108 remain the same. Thus, the amount of correction becomes progressively and proportionately increased as each additional color station is utilized, thus matching the magnitude of correction with the magnitude of error.

When the web distances between rolls is fixed, and when a similar type web is continually run, the sprockets 26, 28 and 30 may be fixed in size. However, to meet all requirements and conditions they preferably are of the split type, easily removable and replaceable by other sizes, with tighteners 110 provided for the chains. Belts, gears or variable pitch pulley type drives may be used.

FIG. 3 shows the scanner 14 and the phase detector 16 located at the second printing rolls P2. However, when better contrast of the mark to the web is necessary, the second, third or later colors may be used as the key color, as described later and then the scanner and phase detector are connected at the respective printing rolls P3 or P4 etc. Intelligence would still be fed to computer control 18, and the corrections to motor 20. Some corrections would be fed ahead in a progressively and proportionately increased manner, and other corrections would be fed backwards in a progressively and proportionately decreased manner. This has already been explained in connection with FIG. 2.

The register means shown at 82, 86 in FIG. 3 is merely one simple example of such means. A different register means which is not limited in the amount of correction which may be introduced is the so-called "running register." In such an arrangement the main drive includes differential gearing, and one part of the differential gearing may itself be slowly turned by the correction motor. In still another arrangement the correction may be made by means of a compensating roller which forms a loop of web between one station and the next, and the reversible correction motor turns screws which shift the bearings of the compensating roller so as to slightly lengthen or shorten the loop of web. The present invention is not concerned with or limited to any particular register means, but rather is concerned with the relative amounts of correction introduced at the different stations.

Figure 4:
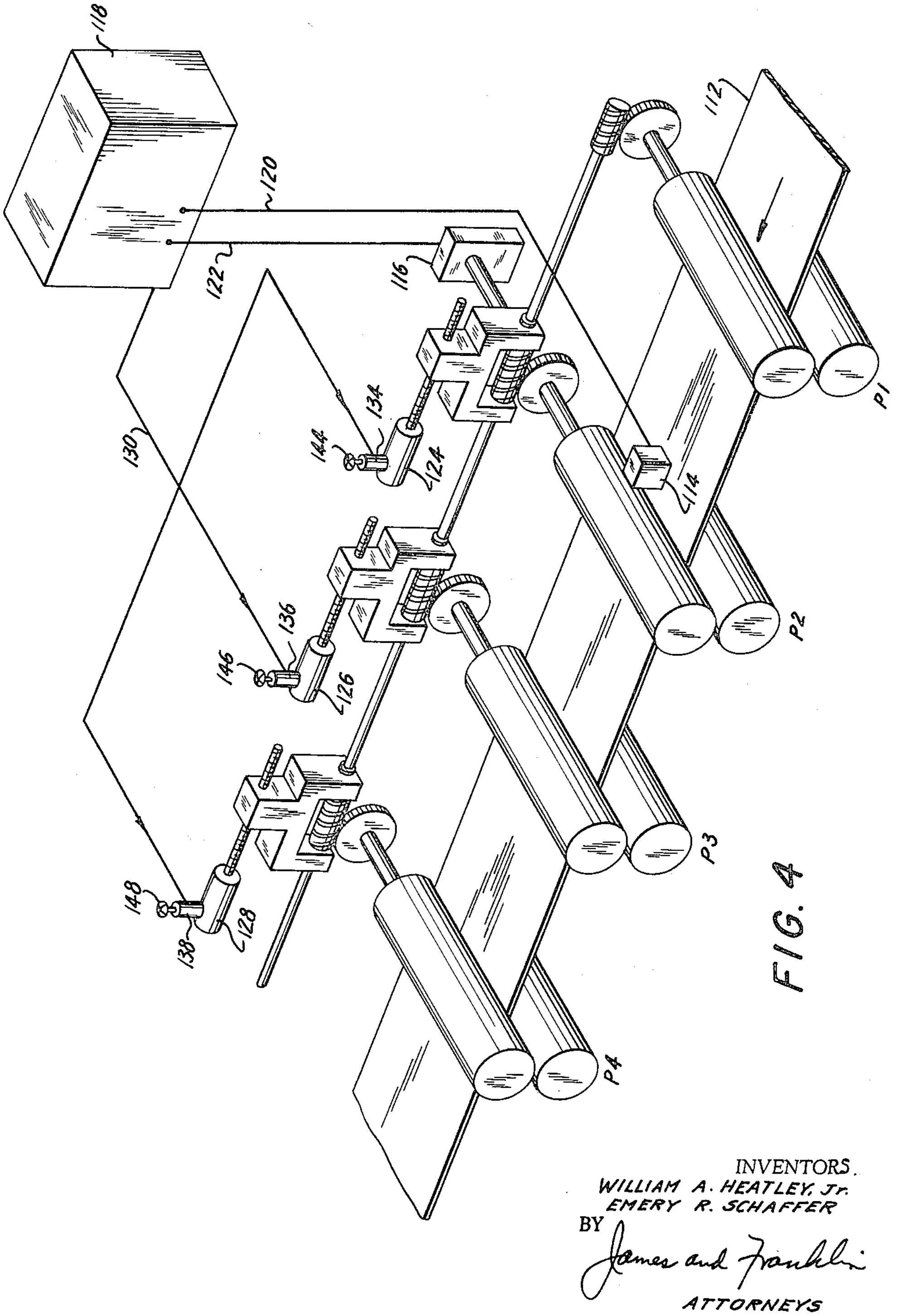
FIG. 4 is a similar view showing a different embodiment of the invention.

Whereas FIG. 3 has a mechanical stepped means for progressively proportional multiple corrections, FIG. 4 illustrates how this may be done by electrical or hydraulic means which is infinitely stepless in adjustment.

Referring to FIG. 4, a reference marker is applied to the web 112 at station P1, and any error in registration is determined by scanners 114 and 116, leading to a computer 118 through wiring 120 and 122 as previously described. The present arrangement differs, however, in that each register means includes its own reversible correction motor, these being indicated at 124, 126 and 128. The motors are energized through a power supply line 130, under the control of the computer 118, which supplies power to energize all of the correction motors. However, the motors are provided with means to effectively and differently adjust their response to the correction power supply, such means being indicated at 134, 136 and 138 under control of adjusting handles 144, 146 and 148.

The motors may be reversible electric motors, in which case the adjusting units may be speed-regulating rheostats adjusted by the handles. In a different case the motors may be hydraulic motors, and the adjusting units may be flow-control valves, the rate of flow being adjusted by the handles.

In any event the adjustments are made such that the corrections progressively increase in magnitude in the direction of web travel, and preferably the corrections are proportional to the length of web between the first station and the subsequent stations.

Figure 5:
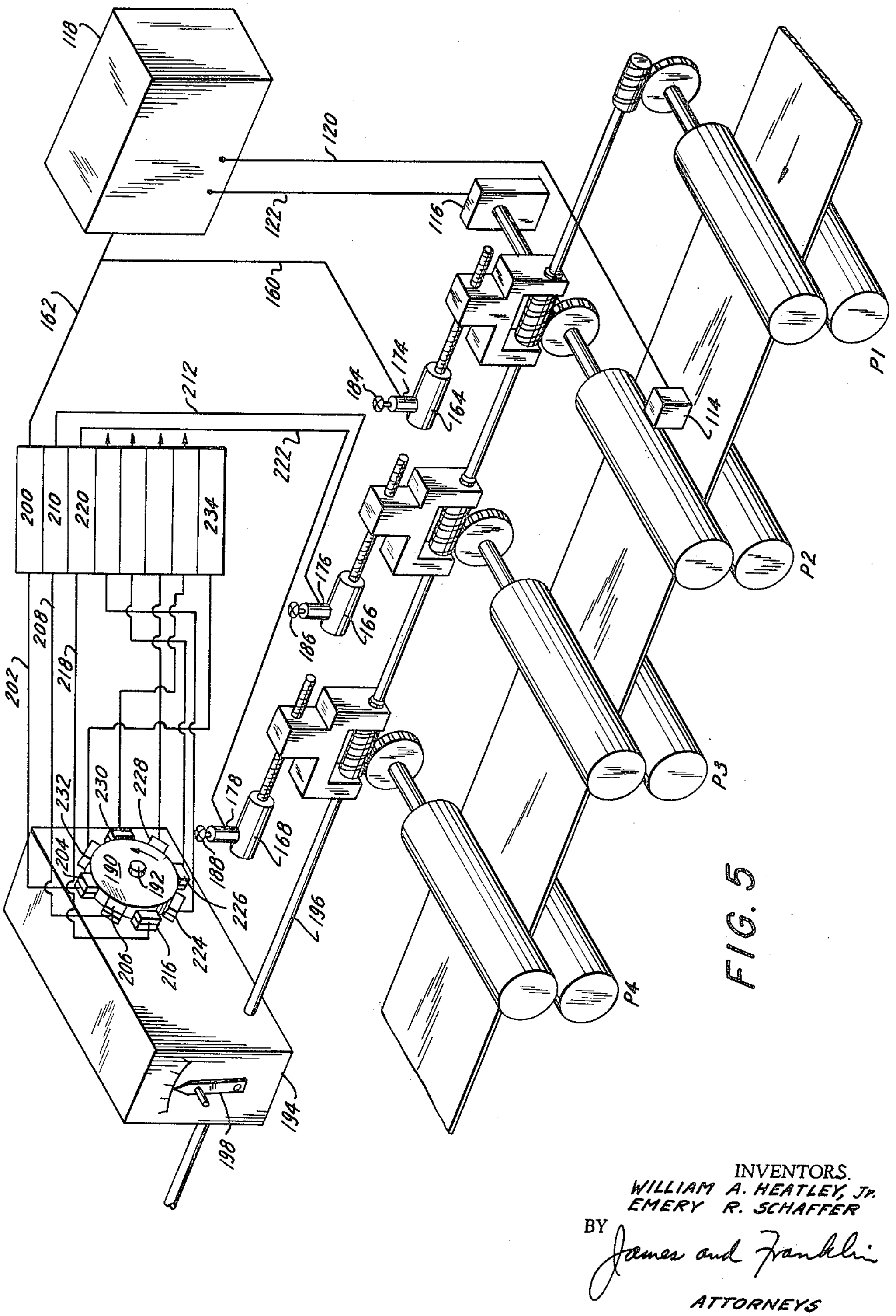
FIG. 5 is a similar view showing apparatus generally like that shown in FIG. 4, but with the addition of means for time delayed correction in later stations.

Referring now to FIG. 5 of the drawing, a provision for an adjustable time delay is shown. Here, as in FIG. 4, the intelligence received from the scanner 114 and the phase detector 116 is fed to the computer control 118 via lines 120 and 122. However, the correction signals from computer 118 are routed and handled in an entirely different manner.

The correction signals are routed through a dual system indicated by lines 160 and 162. Line 160 feeds a signal through proportional device 174 and then to correction motor 164 of printing rolls P2. The other correction motors on subsequent stations are indicated at 166 and 168, and for this example of the invention are assumed to be electric motors. The signals are fed through proportional controls 174, 176 and 178, which in this case are rheostats. The degree of proportionality is independently adjustable by the operator via knobs 184, 186 and 188. Thus, the proportionality feature is still maintained; is independently adjustable for each station; and is divorced from the time delay feature next described.

The delay is obtained by slow rotation of a magnetic disc, shown at 190. This is mounted on the output shaft 192 of a mechanical variable speed reducer 194 driven by the main drive shaft 196. Disc 190 has a cylindrical surface specially coated with a ferrous material to record magnetic pulses. Standard commercial magnetic tape commonly used in tape recorders also may be used if wrapped around and bonded tightly. The ratio of the reducer 194 is adjustable by a control 198 so that the shaft 192 and its disc 190 complete one revolution or less while the web travels from the first station P1 to the last station being used.

The computer control 118 feeds corrections through line 162 to a recording amplifier unit 200. This may be of standard commercial type, and prepares the signal from line 162 so it may be magnetically recorded on the disc surface 190 through line 202 to recording head 204. The correction signals are of two types, "advance" and "retard," and the head 204 is split, or in common terminology is a "two track head." It records on the disc either on the left side for "advance" signals, or on the right side for "retard" signals. Such "two track heads" are of standard type, and commercially available.

The head 204 applies the correction signal to the disc on the proper track and for a length of time determined by the computer control 118. As the disc rotates, a pick-up or reading head 206 picks up the signal, carries it through line 208 to the signal amplifier 210 from where it is relayed through line 212 to parts 176 and 166, and results in a correction at color station P3. The head 206 as shown in FIG. 5 is also of the "two track type," and is orbitally mounted and adjustable in directions indicated by slot 214 in FIG. 7, so that it will pick up the signal from the disc at the exact moment of time when the corresponding web error reaches or is just entering the rolls P3. Thus, the orbit location of reader 206 in an arc 214 provides the proper time delay required, and may be set to lead or lag the web error if so desired.

In like manner, head 216 applies corrections to print unit P4, through wire 218, amplifier 220, and wire 222. Heads 224, 226, 228 and 230 apply corrections to additional color stations, not shown. The later stations are given a longer delay, and the delays are each independently adjustable. The later stations have been omitted to simplify the drawing.

The head 232 is an erase head, and is driven by a bias oscillator circuit 234. Thus the head 232 wipes the disc surface clean in preparation for the new signals. This is standard commercial practice, and it is not deemed necessary to explain or illustrate specific circuitry.

It can now be seen that adjustable time delay is accomplished, and is of a "stored" nature which has an advantage of its own. For instance, if the machine speed is changed, the speed of the disc 190 changes proportionately, maintaining the proper time relationship for the corrections. Thus, acceleration, deceleration, or starts and stops cannot influence the performance of the control mechanism.

The provisions for "proportional" control are independent in adjustment and operation from the provisions for "time delay" control. The magnitude of the correction made is in time and in proportion to the error in the web appearing at the time, and this is done with a single common computer, thus simplifying the entire set-up.

It will be understood that although the illustration shows the intelligence being received from the second station P2, sensing may be done at station P3 or P4, etc. Four color stations are illustrated, but a larger number may be controlled in this manner. Indeed, the time delay feature is important primarily when there are a large number of stations.

While the correction motors and proportional control devices are illustrated as electrical, a hydraulic system may be used, motors 164, 166, and 168 then being hydraulic motors, and the parts 174, 176 and 178 being proportional hydraulic flow valves, with adjustment set by hand wheels 184, 186 and 188. The electrical circuitry then would control solenoid operated valves.

Figures 6, 7:
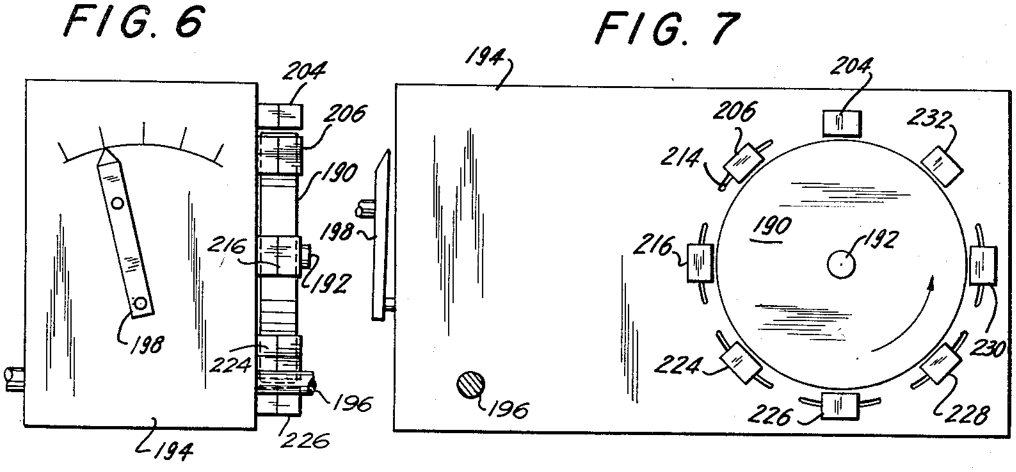
FIGS. 6 and 7 are front and side elevations of one means to produce the desired time delay.

It will be understood that the magnetic wheel 190 shown in FIGS. 5, 6 and 7 may be replaced by a longer loop or band of magnetic material or tape running around two spaced wheels. In such case the recording and pickup heads shown at 204, 206, 216, etc. may be replaced by similar heads which are movable linearly, or parallel to the straight run of the band between its drive wheels, instead of being moved arcuately for adjustment as shown in FIG. 7. In some cases, this may have the advantage of providing a greater spacing between heads for relative adjustment, without requiring a wheel of excessively large diameter.

As so far illustrated the first color acts as the key or reference color and there is no correction applied to the first printing unit. Corrections are applied to the succeeding units including the scanned unit. However, it is not essential to use the first color as the key color, and sometimes for better contrast it is preferred to use a later color as the key color. In such case, there is no correction at the unit which applies the key color, and yet that unit may be the scanned unit. This is illustrated in FIGS. 8, 9 and 10 of the drawing, the dryers and pull units being omitted to simplify the drawing.

Figure 8:
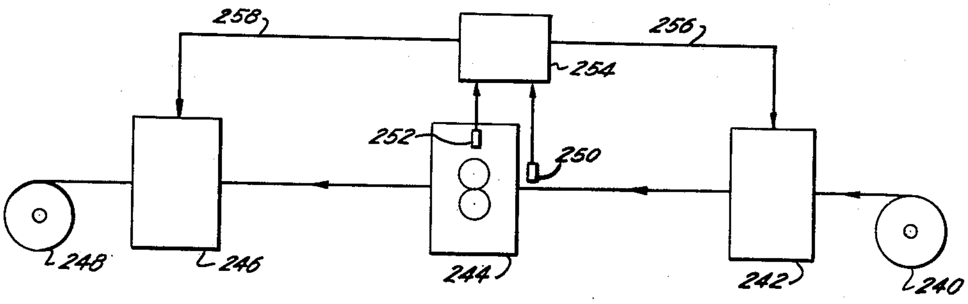
FIGS. 8, 9 and 10 show modifications.

Referring first to FIG. 8, a web supplied at roll 240 passes through stations 242, 244 and 246 and is wound up at roll 248. The color applied at station 244 is considered to be the key color, and scanning means 250 and 252 are located at station 244 together with computer means 254, thereby detecting and measuring a departure from registration. The computer 254 supplies a negative or reverse correction through line 256 to suitable register correcting means at station 242, and it also supplies a positive correction through line 258 leading to register correcting means at station 246. With equal web lengths between stations, the negative correction at station 242 would equal the positive correction at station 246, but in a positive sense they are very different in magnitude. It should be noted that a negative correction at 242 followed by zero correction at 244 followed by a positive correction at 246 constitute corrections which are progressively increasing in magnitude in the direction of movement of the web, and further that the corrections may be made proportional to the length of web between the first station and the succeeding stations. This is true even though there is no correction at all at the second station.

Figure 9:
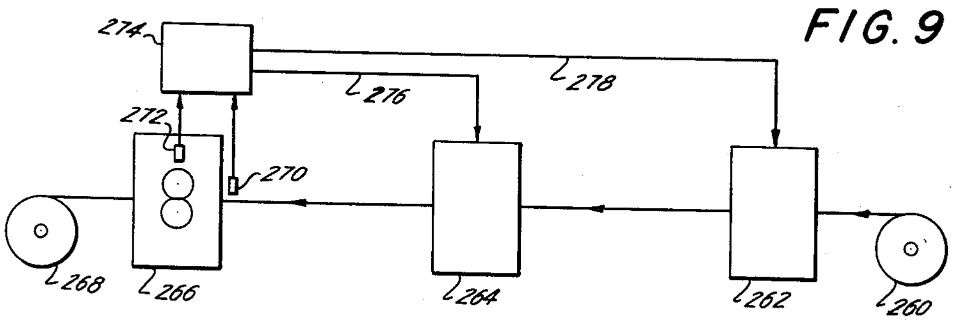
Figure 10:
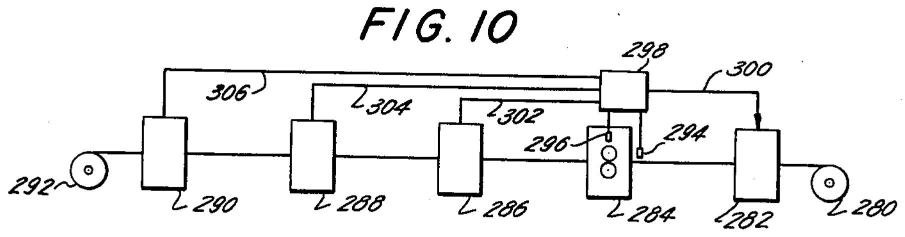

Referring now to FIG. 9, the web is supplied from a roll 260 and runs through stations 262, 264 and 266 to a roll 268. In this case, the key color is the third color, and the scanning means 270 and 272 are located at station 266. As before, a computer 274 measures the error in registration, and supplies a correction call through line 276 to station 264, and also supplies a correction call through line 278 to station 262. The corrections are negative, and the negative correction at station 262 is larger than that at station 264. Assuming equal web lengths, the negative correction at the first station would be double that at the second station.

Nevertheless, for purposes of the present description, it must be recognized that in what we shall call a positive sense, the corrections are progressively increasing in magnitude in the direction of movement of the web, and are approximately proportional to the length of web from the first station. This is true even though there is no correction at the third station, the explanation being that zero correction is relatively a positive correction when it follows a negative correction.

The same principles may be applied to a press line having many more colors. Referring to FIG. 10, a web supplied from roll 280 passes through printing stations 282, 284, 286, 288 and 290, and is rolled up on a roll 292. In this case, the second color is used as a key color, and the second station has scanning heads 294 and 296, which together with a computer 298 measure a departure from registration. The computer supplies a negative or reverse correction through line 300 to register correcting means at station 282. There is zero correction at station 284. The computer supplies a positive correction through line 302 to station 286, and a greater positive correction through line 304 to station 288, and a still greater positive correction through line 306 to station 290. Assuming equal web lengths between stations, the negative correction at station 282 would approximately equal the positive correction at station 286. Station 288 would have a doubled positive correction, and station 290 would have a tripled positive correction.

In this case although there is no correction at station 284 it nevertheless may be said that in a positive sense the corrections are progressively increasing in magnitude in the direction of movement of the web, and the corrections are approximately proportional to the length of web between the first station and the succeeding stations.

Referring to FIG. 3, a negative correction would mean simply the introduction of a direction reversing idler between the correction shaft and the correction means, or the crossing of a drive chain, or the use of a worm gear with a left-hand instead of a right-hand screw action.

In respect to FIG. 4, a negative correction would mean simply a reversal in the direction of operation of a correction motor, compared to other correction motors.

It will be understood that reference to the magnitude of the corrections in a positive sense has nothing to do with the direction of the correction at any moment. Each correcting device is bi-directional or reversible because the error in registration at any moment may be forward or backward. Maintenance of registration is a kind of floating action, with backward and forward corrections frequently alternating. The term positive is therefore used merely to distinguish between the direction of correction in one station relative to another at any one instant. For purposes of the present description, when the key color is not the first color, the correction in stations preceding the key station may be considered negative, and the correction in stations following the key station may be considered positive, these corrections being opposite in direction at any one instant.

It is believed that the principles underlying our improvement, and the method and apparatus for effectuating the same, as well as the advantages thereof, will be apparent from the foregoing detailed description. It will also be apparent that while the invention has been described in several preferred forms, changes may be made without departing from the scope of the invention, as sought to be defined in the following claims.

In the claims the reference to corrections of progressively increasing magnitude in a positive sense is intended to include negative corrections and a zero correction as well as positive corrections, as explained above in connection with FIGS. 8, 9 and 10. The term "positive" is used in a relative sense at any one instant, because at different times the corrections may be forward or backward.

We claim:

1. In the maintenance of registration in an apparatus comprising three or more stations operating on a moving web, the method which includes making a reference marker on the web, detecting departure from registration at any later station, and using that one departure alone to produce registration corrections of different magnitude at all stations except the first, the corrections at the different stations being progressively increasing in magnitude in the direction of movement of the web.

2. In the maintenance of registration in an apparatus comprising three or more stations operating on a moving web, the method which includes making a reference marker on a web, detecting departure from registration at any later station, and using that one departure alone to produce registration corrections of different magnitude at all stations except the first, the corrections at the different stations being approximately proportional to the length of web between the first station and the said different stations respectively.

3. In the maintenance of registration in an apparatus comprising three or more stations operating on a moving web, the method which includes making a reference marker at the first station, detecting departure from registration at the second station, and using that one departure alone to produce registration corrections of different magnitude at the second and all succeeding stations, the correction at the second station being dimensioned to correct the error at that station, and the corrections at the succeeding stations being progressively increasing in magnitude in the direction of movement of the web.

4. In the maintenance of registration in an apparatus comprising three or more stations operating on a moving web, the method which includes making a reference marker on a web, measuring the departure from registration at a later control station, using that departure alone to make a control correction at the control station to correct the departure from registration at the said control station, and using the said same departure alone to make related corrections at all other stations except the first, the related corrections being so related to the control correction that all corrections are progressively increasing in magnitude in the direction of movement of the web.

5. In the maintenance of registration in an apparatus comprising three or more stations operating on a moving web, the method which includes making a reference marker on a web, measuring the departure from registration at a later control station, using that departure alone to make a control correction at the control station to correct the departure from registration at the said control station, and using the said same departure alone to make related corrections at all other stations except the first, the related corrections being so related to the control correction that all corrections are progressively and approximately proportional to the length of web between the first station and the subsequent stations.

6. Apparatus comprising three or more stations operating on a moving web, means to apply a reference marker on the web, scanning means at a later control station connected to computer means to detect and measure a departure from registration at said control station, and means responsive to said one computer means alone for making a control correction at the control station and also related corrections at other stations except the first, the related corrections being so related to the control correction that the corrections are progressively increasing in magnitude in the direction of movement of the web.

7. Apparatus comprising three or more stations operating on a moving web, means to apply a reference marker on the web, scanning means at a later control station connected to computer means to detect and measure a departure from registration at said control station, and means responsive to said one computer means alone for making a control correction at the control station and also related corrections at other stations except the first, the related corrections being so related to the control correction that the corrections are progressively increasing in magnitude in the direction of movement of the web, and delay means to delay the correction applied to a later station compared to the time the correction is applied to an earlier station.

8. Apparatus comprising three or more stations operating on a moving web, means to apply a reference marker on the web, scanning means at a later control station connected to computer means to detect and measure a departure from registration at said control station, and means responsive to said one computer means alone for making a control correction at the control station and also related corrections at other stations except the first, the related corrections being so related to the control correction that the corrections are progressively and approximately proportional to the length of web between the first station and the subsequent station.

9. Apparatus comprising three or more stations operating on a moving web, means to apply a reference marker on the web, scanning means at a later control station connected to computer means to detect and measure a departure from registration at said control station, and means responsive to said computer means for making a control correction at the control station and related corrections at other stations except the first, the related corrections being so related to the control correction that the corrections are progressively and approximately proportional to the length of web between the first station and the subsequent station, and delay means to delay the correction applied to a later station compared to the time the correction is applied to an earlier station.

10. Apparatus comprising three or more stations operating on a moving web, means at the first station to apply a reference marker on the web, scanning means at the second station connected to computer means to detect and measure a departure from registration at said second station, and means responsive to said one computer means alone for making a correction at the second station and also related corrections at other stations except the first, the related corrections being so related to the correction at the second station that the corrections are progressively and approximately proportional to the length of web between the first station and the subsequent station.

11. Apparatus comprising three or more stations operating on a moving web, a main shaft with gearing at each station to drive the stations in synchronism, means to apply a reference marker on the web, scanner means at a station and computer means for measuring the departure from registration, a reversible correction motor controlled by said computer means for driving a common correction shaft, register means at each station but one for feeding into the gearing a corrective movement at that station, and a drive coupling between the said common correction shaft and the register means at each such station, said drive couplings having different drive ratios such that the corrections fed in at the different stations progressively increase in magnitude in a positive sense in the direction of movement of the web.

12. Apparatus comprising three or more stations operating on a moving web, a main shaft with gearing at each station to drive the stations in synchronism, means to apply a reference marker on the web, scanner means at a station and computer means for measuring the departure from registration, a reversible correction motor controlled by said computer means for driving a common correction shaft, register means at each station but one for feeding into the gearing a corrective movement at that station, and a drive coupling between the said common correction shaft and the register means at each such station, said drive couplings having different drive ratios such that the corrections fed in at the different stations when considered in a positive sense are progressively approximately proportional to the length of web between the first station and the subsequent stations.

13. Apparatus comprising three or more stations operating on a moving web, a main shaft with gearing at each station to drive the stations in synchronism, means at a first station to apply a reference marker on the web, scanner means at a later station and computer means for measuring the departure from registration, a reversible correction motor controlled by said computer means for driving a common correction shaft extending collaterally of the main shaft, register means at each station for feeding into the gearing a corrective movement at that station, and a drive coupling between the said common correction shaft and the register means at each station, said drive couplings having different drive ratios such that corrections fed in at the different stations are progressively approximately proportional to the length of web between the first station and the subsequent stations.

14. Apparatus comprising three or more stations operating on a moving web, a main shaft with gearing at each station to drive the stations in synchronism, means to apply a reference marker on the web, scanner means at a later station and computer means for measuring the departure from registration, a reversible correction motor at the second and each succeeding station, means responsive to the said one computer for supplying correction power to energize all of said correction motors, and means to differently adjust the response of the correction motors to the correction power supply, the adjustments being such that the corrections progressively increase in magnitude in the direction of movement of the web.

15. Apparatus comprising three or more stations operating on a moving web, a main shaft with gearing at each station to drive the stations in synchronism, means to apply a reference marker on the web, scanner means at a later station and computer means for measuring the departure from registration, a reversible correction motor at the second and each succeeding station, means responsive to the said one computer for supplying correction power to energize all of said correction motors, and means to differently adjust the response of the correction motors to the correction power supply, the adjustments being such that the corrections progressively increase in magnitude in the direction of movement of the web, and a delay means interposed in the power supply leading to a correction motor at a later station in order to delay the time of correction at the later station relative to the time of correction at an earlier station.

16. Apparatus comprising three or more stations operating on a moving web, a main shaft with gearing at each station to drive the stations in synchronism, means to apply a reference marker on the web, scanner means at a later station and computer means for measuring the departure from registration, a reversible correction motor at the second and each succeeding station, means responsive to the said one computer for supplying correction power to energize all of said correction motors, and means to differently adjust the response of the correction motors to the correction power supply, the adjustments being such that the corrections are progressively and approximately proportional to the length of web between the first station and the subsequent stations.

17. Apparatus comprising three or more stations operating on a moving web, a main shaft with gearing at each station to drive the stations in synchronism, means to apply a reference marker on the web, scanner means at a later station and computer means for measuring the departure from registration, a reversible correction motor at the second and each succeeding station, means responsive to the computer for supplying correction power to energize said correction motors, and means to differently adjust the response of the correction motors to the correction power supply, the adjustments being such that the corrections are progressively and approximately proportional to the length of web between the first station and the subsequent stations, and a delay means interposed in the power supply leading to a correction motor at a later station in order to delay the time of correction at the later station relative to the time of correction at an earlier station.

18. Apparatus comprising three or more stations operating on a moving web, a main shaft with gearing at each station to drive the stations in synchronism, means at the first station to apply a reference marker on the web, scanner means at the second station and computer means for measuring the departure from registration, a reversible correction motor at the second and each succeeding station, means responsive to the said one computer for supplying correction power to energize all of said correction motors, and means to differently adjust the response of the correction motors to the correction power supply, the adjustments being such that the corrections are progressively and approximately proportional to the length of web between the first station and the subsequent stations.

19. In the maintenance of registration in an apparatus comprising three or more stations operating on a moving web, the method which includes making a reference marker on the web, detecting departure from registration at one of the stations, and using that one departure alone to produce registration corrections of different magnitude at all stations but one, the corrections at the different stations being progressively increasing in magnitude in a positive sense in the direction of movement of the web.

20. In the maintenance of registration in an apparatus comprising three or more stations operating on a moving web, the method which includes making a reference marker on a web, detecting departure from registration at one of the stations, and using that one departure alone to produce registration corrections of different magnitude at all stations but one, the corrections at the different stations when considered in a positive sense being approximately proportional to the length of web between the first station and the said different stations respectively.

21. Apparatus comprising three or more stations operating on a moving web, means to apply a reference marker on the web, scanning means at a control station connected to computer means to detect and measure a departure from registration at said control station, and means responsive to said single computer means for making control corrections at all stations but one, the corrections being so related that the corrections are progressively increasing in magnitude in a positive sense in the direction of movement of the web.

22. Apparatus comprising three or more stations operating on a moving web, means to apply a reference marker on the web, scanning means at a control station connected to computer means to detect and measur a departure from registration at said control station, and means responsive to said single computer means for making corrections at all stations but one, the corrections being so related that the corrections when considered in a positive sense are progressively increasing and approximately proportional to the length of web between the first station and the subsequent station.

23. Apparatus comprising three or more stations operating on a moving web, a main shaft with gearing at each station to drive the stations in synchronism, means to apply a reference marker on the web, scanner means at a station and computer means for measuring the departure from registration, a reversible correction motor at all stations but one, means responsive to the said one computer means for supplying correction power to energize all of said correction motors, and means to differently adjust the response of the correction motors to the correction power supply, the adjustments being such that the corrections when considered in a positive sense progressively increase in magnitude in the direction of movement of the web.

24. Apparatus comprising three or more stations operating on a moving web, a main shaft with gearing at each station to drive the stations in synchronism, means to apply a reference marker on the web, scanner means at a station and computer means for measuring the departure from registration, a reversible correction motor at all stations but one, means responsive to the said one computer for supplying correction power to energize all of said correction motors, and means to differently adjust the response of the correction motors to the correction power supply, the adjustments being such that the corrections when considered in a positive sense are progressively increasing and approximately proportional to the length of web between the first station and the subsequent stations.

References Cited in the file of this patent

UNITED STATES PATENTS

| | | |
|---|---|---|
| 2,615,393 | Albrecht | Oct. 28, 1952 |
| 2,714,351 | Koch | Aug. 2, 1955 |
| 2,888,260 | Schowerer et al. | May 26, 1959 |